No. 726,150. PATENTED APR. 21, 1903.
F. M. DWIGHT.
BALANCING DEVICE FOR CULTIVATORS OR THE LIKE.
APPLICATION FILED OCT. 1, 1902.
NO MODEL.
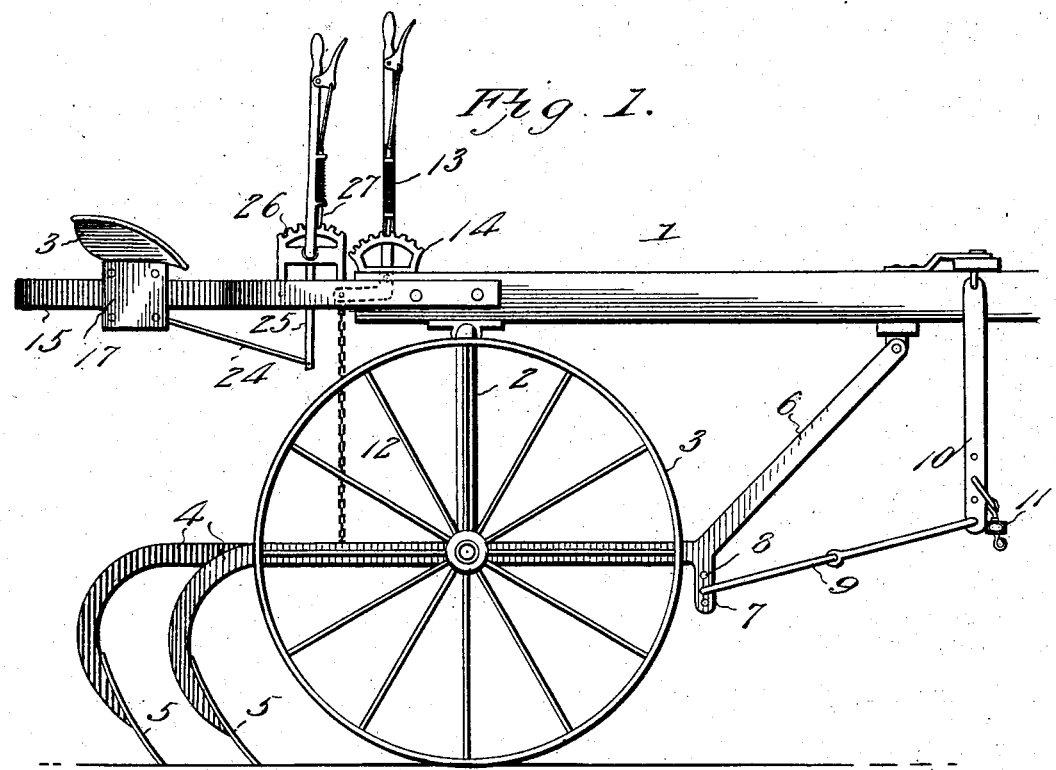
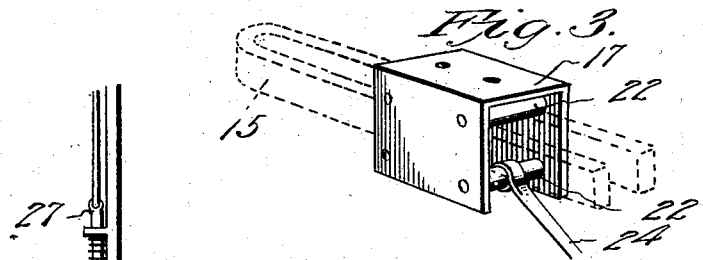
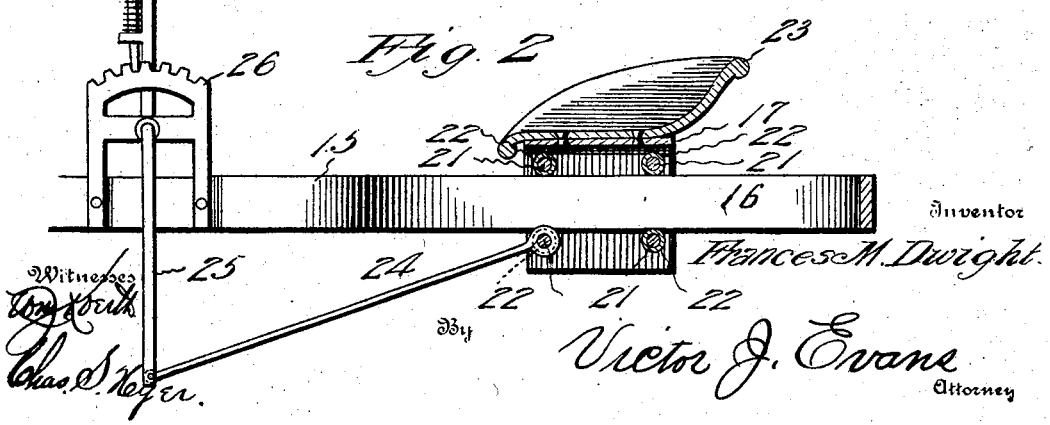

UNITED STATES PATENT OFFICE.

FRANCES M. DWIGHT, OF WILLOWPOINT, TEXAS.

BALANCING DEVICE FOR CULTIVATORS OR THE LIKE.

SPECIFICATION forming part of Letters Patent No. 726,150, dated April 21, 1903.

Application filed October 1, 1902. Serial No. 125,543. (No model.)

*To all whom it may concern:*

Be it known that I, FRANCES M. DWIGHT, a citizen of the United States, residing at Willowpoint, in the county of Wise and State of Texas, have invented new and useful Improvements in Balancing Devices for Cultivators or the Like—to wit, instantaneous adjustable seat and tongue-balance—of which the following is a specification.

This invention relates to a balancing device for cultivators and the like; and the object of the same is to provide a simple and effective means for changing the position of a driver or operator riding on the cultivator, so that his weight may be imposed at different points to regulate the depth of the downward drawing action of the cultivating-plows or analogous implements into the ground and so counterbalance the machine that the draft strain falling upon the draft-animals under such downward drawing action will be materially relieved and the cultivating-plows or like implements caused to penetrate the ground more evenly.

The invention consists in the construction and arrangement of the several parts, which will be more fully hereinafter described and claimed.

In the drawings, Figure 1 is a side elevation of a portion of a cultivator embodying the features of the invention. Fig. 2 is a longitudinal vertical section through a part of a cultivator and the improved attachment. Fig. 3 is a detail perspective view of a movable seat-support, showing the means with which it engages in dotted lines.

Similar numerals of reference are employed to indicate corresponding parts in the several views.

The numeral 1 designates the frame of a cultivator of any preferred form having an arched axle 2, with carrying or ground wheels 3 thereon. Beneath the frame 1 and extending under the axle 2 are cultivator-beams 4, having suitable cultivators, such as shovels or other implements 5, secured in the usual manner to their rear ends. The beams 4 at the front connect with an upwardly-projecting hanger-arm 6, pivotally attached to the under portion of the frame at a suitable point in advance of the axle 2, and having a depending projection 7, with apertures 8 therein, which are adjustably engaged by links 9, running forwardly to a draft-hanger 10, to which singletrees 11 or the like are adapted to be adjustably secured to regulate the draft, as will be readily understood. Connected to the beams 4 is an adjusting-chain 12, attached to an adjusting-lever 13, coöperating in relation to a toothed segment 14 on the frame 1.

The machine as thus far described is one well known in the art and is illustrated to show the practical application of the invention, as it will be understood that any form of cultivator or other device may have the improved balancing means attached thereto.

The improved attachment comprises a rearwardly-projecting looped extension 15, having opposite side members 16 in parallel relation with their forward extremities secured firmly to the bottom of the rear end of the frame 1. On this extension 15 a seat-support 17 is movably mounted, and consists of a box-like frame open at the bottom and rear end and closed at the sides and top. Extending transversely across the interior of the support 17 are front and rear pairs of pins or rods 21, having rollers 22, mounted thereon and spaced apart vertically a distance sufficient to closely bear upon the upper and lower edges of the members 16 of the extension 15. A seat 23 of usual form is secured on the support 17, and attached to the front roller 22 is the rear end of a link 24, having its forward extremity loosely connected to the depending member of a bell-crank adjusting-lever 25, pivotally attached to one side of a toothed segment 26, secured on one of the members 16 close to the rear end of the frame 1, as clearly shown by Fig. 1. The bell-crank adjusting-lever 25 has a spring-actuated dog 27 to coöperate with the toothed segment 26 to maintain the adjustment of the seat-support 17 and seat 23, carried thereby.

When the operator or driver ascertains that the shovels, plows, or other implements on the beams 4 are drawing downwardly too great a depth, and thereby imposing upon the draft-animals an extra strain, he shifts the lever 25 so as to move the support 17 rearwardly on the extension 15, and this adjustment will be pursued until the said downwardly-drawing tendency of the cultivating devices carried by the beams 4 has been counterbalanced and the strain relieved from the draft-animal. This adjustment will also cause the shovels or other implements carried by the beams 4 to penetrate the ground evenly, and if it is found that the penetration is too shallow the support 17, together with the seat 23, carried thereby, can be moved toward the end of the frame 1 a proportionate distance until the defect has been overcome.

The improved attachment will be found exceptionally useful, and the proportions, dimensions, and minor details may be varied to compensate for the application of the improvement to different styles of machines.

Having thus fully described the invention, what is claimed as new is—

1. The combination with a cultivating-machine, of an extension extending rearwardly from the frame thereof, a seat-support slidably mounted on the said extension and carrying a seat, and adjusting means secured to the front portion of said support whereby the weight of a driver may be utilized to counterbalance other parts of the machine.

2. The combination with a cultivator, of a rearwardly-projecting looped extension secured thereto, a box-like support having rollers therein engaging the opposite members of the extension and carrying a seat on the upper side thereof, and adjusting means mounted on the extension and secured to the front extremity of the support.

3. The combination with a cultivator, of an extension projecting rearwardly from the frame thereof, a box-like support having rollers to engage the said frame, and also carrying a seat, and means for adjusting said support.

In testimony whereof I affix my signature in presence of two witnesses.

FRANCES M. DWIGHT.

Witnesses:
A. W. THRESHER,
W. L. MILLER.